(12) United States Patent
Hardman

(10) Patent No.: US 6,844,813 B2
(45) Date of Patent: Jan. 18, 2005

(54) COOPERATIVE VENDING MACHINE DATA REPORTING

(75) Inventor: Simon F. Hardman, Masterton (NZ)

(73) Assignee: Vending Management Services Limited, Masterton (NZ)

( * ) Notice: Subject to any disclaimer, the term of this patent is extended or adjusted under 35 U.S.C. 154(b) by 321 days.

(21) Appl. No.: 10/093,755

(22) Filed: Mar. 8, 2002

(65) Prior Publication Data

US 2003/0169180 A1 Sep. 11, 2003

(51) Int. Cl.[7] .............................................. H04Q 7/00
(52) U.S. Cl. ................... 340/539.1; 379/39; 379/40; 379/90.01; 379/93.12
(58) Field of Search ..................... 379/39, 40, 90.1, 379/93.12, 539.1

(56) References Cited

U.S. PATENT DOCUMENTS

| 445,042 | A | 1/1891 | Carrara | |
|---|---|---|---|---|
| 6,069,588 | A | 5/2000 | O'Neill, Jr. | 343/713 |
| 6,174,205 | B1 | 1/2001 | Madsen et al. | 439/638 |
| 6,181,284 | B1 | 1/2001 | Madsen et al. | 343/702 |
| 6,222,458 | B1 | 4/2001 | Harris | 340/686.6 |
| 6,246,376 | B1 | 6/2001 | Bork et al. | 343/760 |
| 6,255,800 | B1 | 7/2001 | Bork | 320/115 |
| 6,263,503 | B1 | 7/2001 | Margulis | 725/81 |
| 6,289,389 | B1 | 9/2001 | Kinkinis | 709/239 |
| 6,430,268 | B1 * | 8/2002 | Petite | 379/39 |
| 2001/0002211 | A1 | 5/2001 | Lee | 379/414 |
| 2001/0002906 | A1 | 6/2001 | Rune | 370/345 |
| 2001/0002908 | A1 | 6/2001 | Rune et al. | 370/392 |
| 2001/0006512 | A1 | 7/2001 | Takabatake et al. | 370/329 |
| 2001/0010689 | A1 | 8/2001 | Awater et al. | 370/344 |
| 2002/0016829 | A1 | 2/2002 | Defosse | 709/217 |

FOREIGN PATENT DOCUMENTS

| WO | WO 98/08311 | 2/1998 |
|---|---|---|
| WO | WO 00/14692 | 3/2000 |
| WO | WO 01/20844 A1 | 3/2001 |

* cited by examiner

Primary Examiner—Daryl C. Pope
(74) Attorney, Agent, or Firm—Withrow & Terranova, PLLC

(57) ABSTRACT

A vending machine is equipped with a short range communication circuit for uploading vending machine data to passing mobile terminals. The mobile terminals subsequently upload the data to a remote location through a wireless communication process, such as through a cellular phone call. Compensation may be provided to the user of the mobile terminal and aggregation between mobile terminals and/or vending machines is contemplated.

36 Claims, 6 Drawing Sheets

COOPERATIVE VENDING MACHINE DATA REPORTING

FIELD OF THE INVENTION

The present invention relates to a vending machine and particularly to a vending machine which is not in cellular communication with a remote location for reporting of data associated with the vending machine.

BACKGROUND OF THE INVENTION

Vending machines are a simple way in which to provide snacks, drinks, or other goods and services to a general audience that passes by the vending machine. While most vending machines sell sodas and snacks, some vending machines have also been contemplated for other uses, such as selling insurance, dispensing tickets, or the like.

It is common for a vending machine to be serviced by an individual to restock the vending machine with the elements that are dispensed therefrom. To minimize unnecessary costs, many vending machines now have an internal communication circuit through which the vending machine reports vending machine data, such as sales, inventory, and status to a remote location. Examples of such systems are disclosed in U.S. Pat. Nos. 6,181,981 and 5,207,784. In the initial implementations of these communication circuits, a landline was required and the vending machine communicated over the PSTN, such as through a modem or the like.

Subsequent developments have included TCP/IP interfaces on vending machines, but have still required a landline connection between the remote location and the vending machine. A more recent evolution in the vending machine world is the use of a cellular communication circuit that communicates vending machine data wirelessly through a cellular network to a remote location. This however, requires that the vending machine be positioned in a place that has cellular coverage.

As vending machines become more ubiquitous, there is an increasing likelihood that the vending machine may be in a position where it is difficult to provide a land-based telephone line or be within acceptable cellular coverage. Remote locations may lack cellular coverage, and it may also be cost prohibitive to run a landline to the vending machine. Likewise, building basements and parking structures may have difficulty receiving adequate cellular coverage and be unwilling to install additional landlines so that the vending machine may communicate with the remote location.

Thus, there remains a need for a vending machine that may communicate to a remote location without reliance on a landline or cellular coverage.

SUMMARY OF THE INVENTION

The present invention addresses the need for additional communication options by providing a vending machine with a short range communication circuit, such as a Bluetooth module. The short range communication circuit communicates wirelessly with mobile terminals, such as cellular phones, that pass by the vending machine, and upload vending machine data to the cellular phone. When the cellular phone subsequently passes into an area with the appropriate cellular service, the cellular phone places a phone call to a remote location and uploads the vending machine data to the remote location computer.

In an exemplary embodiment, the cellular phone may wait until a non-peak time to send the data to the remote location. Further, the cellular phone operator may be compensated for the use of his cellular phone and any calling plan minutes used to relay vending machine data. Various types of compensation are contemplated.

In another exemplary embodiment, the cellular phone may aggregate vending machine data from multiple vending machines before making the phone call to the remote location.

In still another embodiment, the cellular phone may pass by another cellular phone, both having vending machine data thereon. The cellular phone with the largest amount or oldest vending machine data may collect the vending machine data from the other cellular phone and send a combined report to the remote location.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
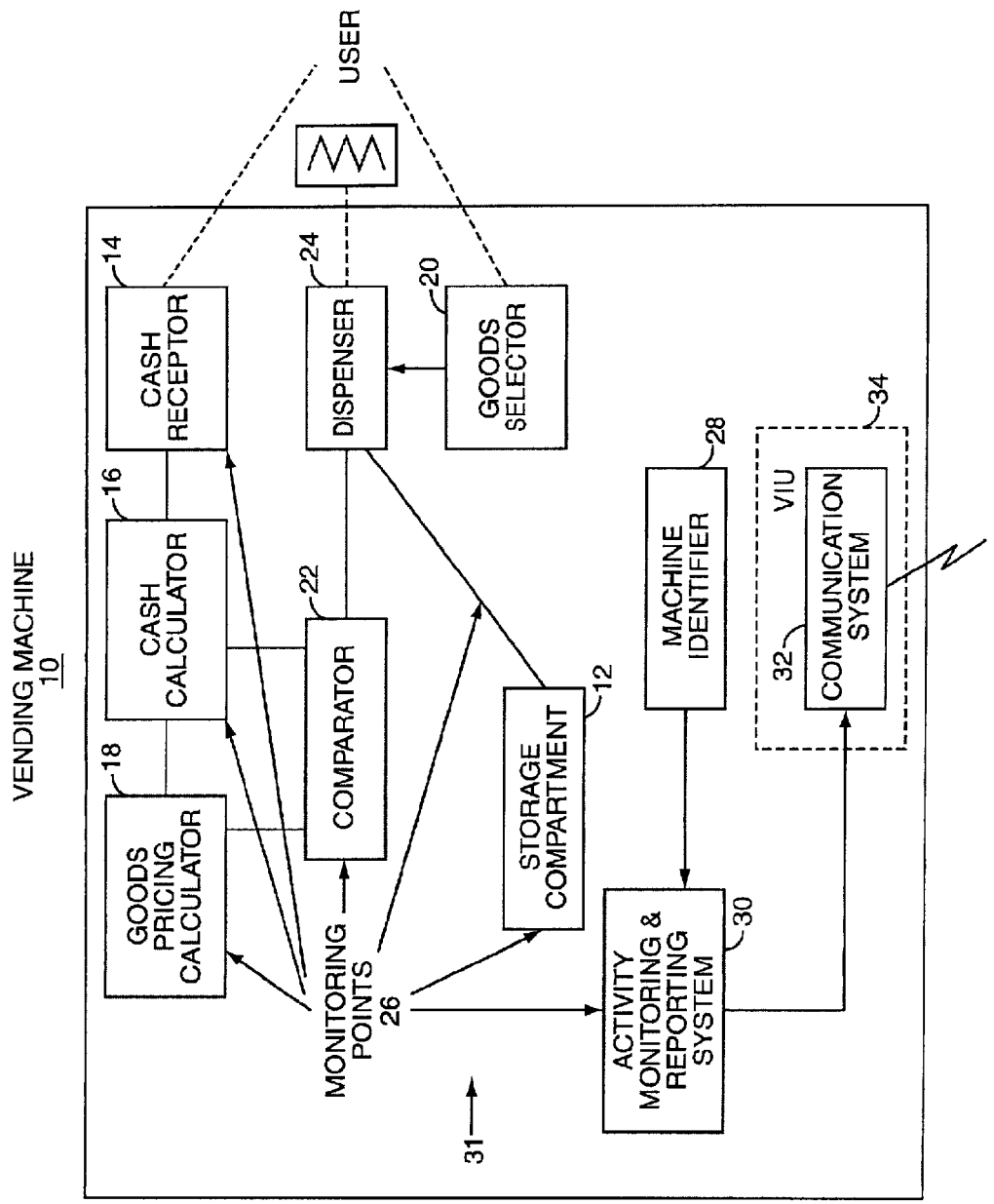
FIG. 1 is an exemplary vending machine such as may be used with the present invention.

Shown in FIG. 1, a vending machine 10 comprises one or more storage compartments 12 for storing one or more categories of goods to be dispensed. In an exemplary embodiment, these are racks to hold soda cans or the like. The vending machine further comprises a cash receptor 14 for receiving cash deposits from a user, which in an exemplary embodiment comprises a coin and bill acceptor. Additionally, a credit or debit card reader or the like may be present on the vending machine 10 for payment of goods to be dispensed. A cash calculator 16 for determining the value of the cash deposited by the user interfaces with the cash receptor 14 as is well understood. A goods pricing calculator 18 for determining the price of particular goods selected by the user is operatively associated with the cash calculator 16. A goods selector 20 allows a user to select goods to be dispensed may comprise buttons, keys, or the like disposed on the outside of the vending machine. In an exemplary embodiment these buttons may be illuminated.

A comparator 22 compares the value of the cash deposited by the user with the price of the goods selected by the user and allows the dispenser 24 to dispense the goods to the user if the user has deposited sufficient cash or other payment. The dispenser 24 may further provide change back to the user if the cash inserted exceeds the price of the goods as is well understood.

The vending machine 10 may also include a device for detecting certain conditions, such as out-of-stock, jam, or unauthorized entry. A plurality of monitoring points 26 may monitor or detect such conditions as well as monitor the operation of the vending machine 10; specifically, the receipt of cash or other payment, dispensing of change, the selection of goods by a user, the actual dispensing of goods so selected and fault conditions.

For a further explanation of vending machines and their construction, reference is made to U.S. Pat. Nos. 6,181,981 and 5,207,784, both of which are hereby incorporated by reference in their entireties.

The vending machine 10 may be provided with a unique machine identifier 28, such as a serial number, which may be electronically encoded. The vending machine 10 may further comprise an activity monitoring and reporting system 30, which interfaces with a communication system 32 that forms part of the present invention.

Collectively, the cash calculator 16, the goods pricing calculator 18, the comparator 22, the activity monitoring and reporting system 30 as well as any memory may form a control system 31. In practice, these elements may be incorporated onto a single printed circuit board, a single microprocessor, or, alternatively, they may be distinct components each on their own circuit board module as needed or desired. While electronic components are specifically contemplated as being used in the preferred embodiment, some elements may be mechanical such as a memory which could be a switch or DIP switch. The above description of the vending machine 10 is provided for exemplary purposes only, and those of ordinary skill in the art may readily recognize permutations or variations thereof without departing from the scope or intent of the present invention.

In an exemplary embodiment, the communication system 32 comprises a short range communication circuit such as a Bluetooth module or a communication circuit (explicitly labeled 38 in FIG. 2) that conforms to the IEEE 802.11 standard. For further information about Bluetooth and its standards, reference is made to www.bluetooth.com. In particular, reference is made to the Core Specification (Volume I) and Profile Definitions (Volume II) provided on that page and available to Bluetooth SIG members. For more information about IEEE 802.11, the IEEE publishes the standard, and as of this writing, makes the standards for IEEE 802.11 available for free at http://standards.ieee.org/getieee802/. The standards of both Bluetooth and IEEE 802.11 are hereby incorporated by reference.

For the purposes of the present invention, a short range communication circuit 38 includes those communication circuits which operate at a range of up to one hundred meters. In a more preferred embodiment, short range communication circuits operate at a range of about ten meters. Ultrasonic, infrared, microwave, and radio frequency signals are all contemplated. The Bluetooth and 802.11 protocols are well-publicized and thus are presently more likely to receive commercial acceptance, but certainly other short range protocols and techniques are possible.

In one embodiment of the present invention, the communication system 32 is associated with a vendor interface unit (VIU) 34, which interfaces with the control system 31 of the vending machine 10. In particular, several of the functions described in association with the vending machine 10 may be performed by a vending machine controller (VMC). The VMC is sometimes referred to herein as control system 31. As noted above, the control system 31 or VMC may incorporate some or all of the electronic components of the vending machine 10. The VIU 34 may extract the vending machine data (also called the Vending Interface Data Transfer Standard (VIDTS) data) according to known protocols including DEX/UCS, MBDMDB, and DDCMP.

In practice, the vending machine 10 should try to send the VIDTS data to a remote location at least once a day so as to promote efficient servicing of the vending machine 10. In the past, this was done via a landline or via a long range wireless connection, such as a cellular phone call. This requires either the installation of the landline or cellular coverage. The present invention addresses this by installing the short range communication circuit 38 in the vending machine 10 and utilizing it as illustrated in FIGS. 2 and 3.

Figure 2:
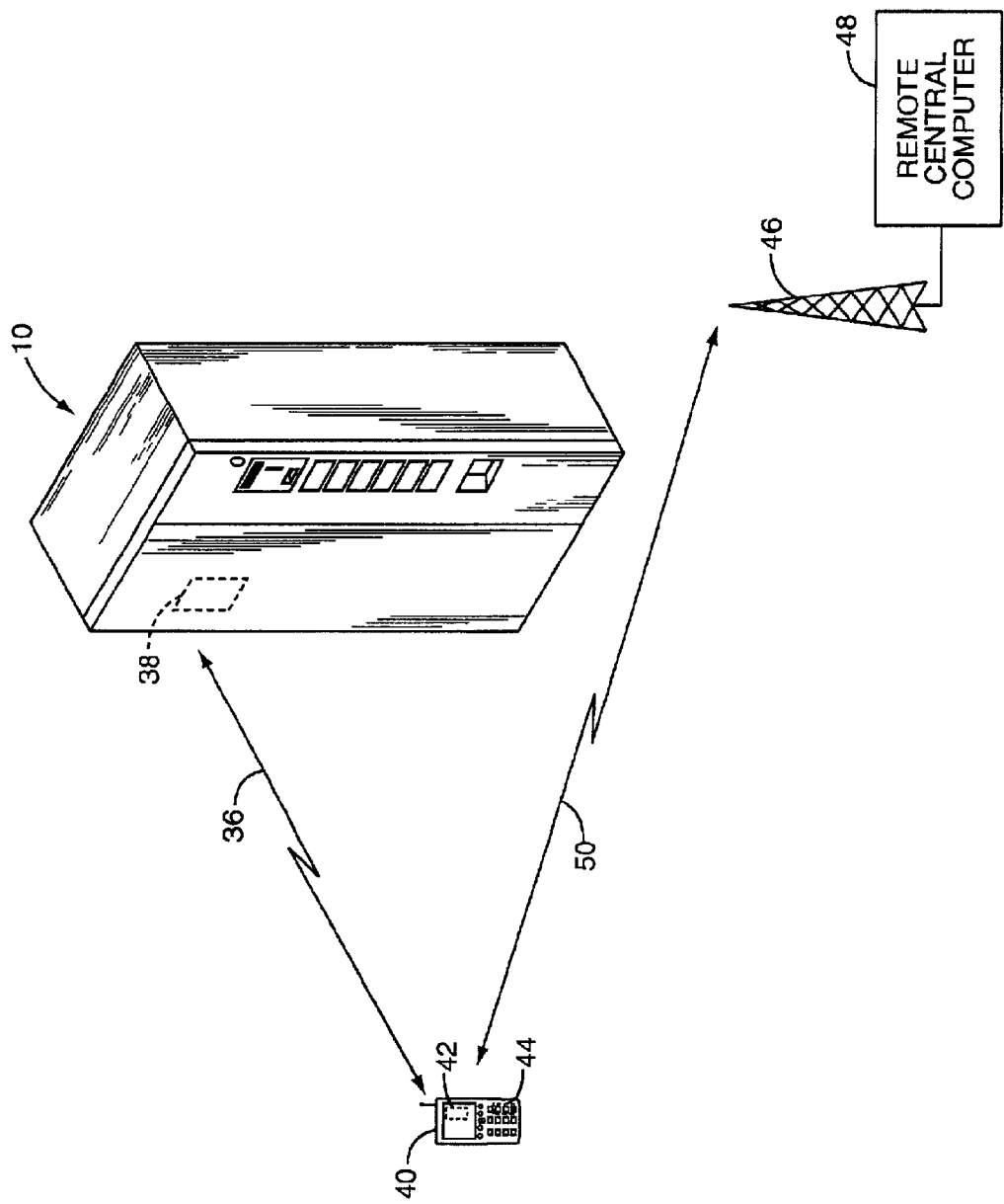
FIG. 2 is an exemplary hardware diagram of a system that implements the present invention.

Specifically, the hardware used in one embodiment of the present invention is illustrated in FIG. 2. The vending machine 10 communicates over a short range with a short range signal 36 to a mobile terminal 40 that passes by the vending machine 10. The mobile terminal 40 may be a cellular phone, a personal digital assistant, a two way pager, a laptop equipped with a cellular modem, or the like. Such mobile terminals are also sometimes referred to as pervasive computing devices. The mobile terminal 40 comprises a short range communication circuit 42 that, in a preferred embodiment, is compatible with the short range communication circuit 38 of the vending machine 10. As noted earlier, the short range signal 36 may be almost any environmentally safe signal that has an operative range of approximately five meters or less.

The mobile terminal 40 is also equipped with a long range communication circuit 44 that communicates through a base station 46 to a remote central computer 48 at a remote location via a long range communication signal 50. The long range communication signal 50 may be any number of conventional long range wireless communication signals such as those propounded under GSM, AMPS, D-AMPS, wCDMA, IS-95, and the like. In an exemplary embodiment, the long range communication signal 50 comprises a cellular telephone call placed over the Public Land Mobile Network (PLMN). Short Message Service (SMS) or the like could also be used if needed or desired.

Figure 3:
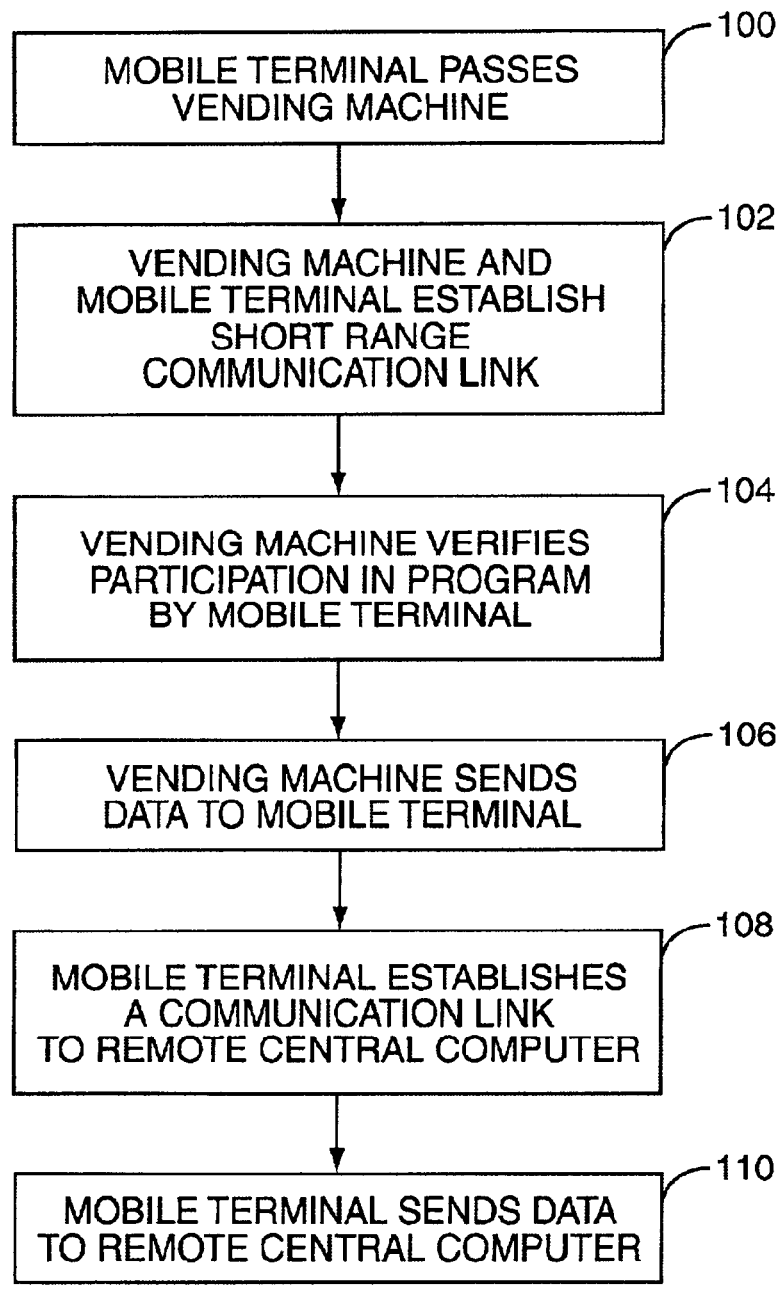
FIG. 3 is a flow chart illustrating the vending machine to mobile terminal to remote location processes.

The process by which the vending machine 10 communicates with the remote central computer 48 is illustrated as a flow chart in FIG. 3. Specifically, a user, who may be using the vending machine, brings the mobile terminal 40 proximate the vending machine 10 (block 100). Note that the user need not actually use the vending machine 10, but merely pass within range of the short range communication circuits 38, 42.

The vending machine 10 and the mobile terminal 40 establish a short range communication link (block 102). In an exemplary embodiment, the vending machine 10 periodically sends out an inquiry from the short range communication circuit 38 polling for other short range communicators within the field of the short range communication circuit 38. In the Bluetooth embodiment, this forces any Bluetooth enabled devices to respond and a master-slave relationship set up so that communication according to the protocol may occur. Similar schemes may be used for other protocols. In an alternate embodiment, the mobile terminal 40 may initiate the contact, either through a user command or by periodically polling for short range communicators in the field of the short range communication circuit 42. This may unnecessarily drain the battery of the mobile terminal 40, but it is an option.

The vending machine 10 may then verify that the mobile terminal 40 that has responded over the short range communication link is in fact a participant in the cooperative data handling process (block 104). This may be done by exchanging messages, authentication codes or other authorization verification schemes. Note that this is an optional step.

The vending machine 10 sends the vending machine data to the mobile terminal 40 (block 106). This may be in a burst transmission, encrypted, or otherwise handled so as to achieve an efficient, secure transmission between the vending machine 10 and the mobile terminal 40. The mobile terminal 10 may include memory as is conventional, and store the vending machine data therein.

After receiving the vending machine data, the mobile terminal 40 establishes a communication link to the remote central computer 48 (block 108). This communication link may be done periodically, such as once a day, or after a certain time delay, such as one hour after the data was collected from the vending machine 10. The communication link may be created by placing a phone call to a number associated with the remote central computer 48 over a cellular connection or other technique as needed or desired. However, it is contemplated that the mobile terminal 40 will make this connection with the long range communication circuit 44. Alternatively, the remote central computer 48 may periodically place a call to the mobile terminal 40 to establish the link. In yet another embodiment, the mobile terminal 40 periodically docks with the remote central computer 48 to establish a communication link. In still another embodiment, the mobile terminal 40 is periodically connected to a landline and a communication link is established over a landline rather than wirelessly through the long range communication circuit 44.

After establishing the communication link between the mobile terminal 40 and the remote central computer 48, the mobile terminal 40 sends the vending machine data to the remote central computer 48 (block 110). Again, there may be an authentication step (not shown) or the like as needed or desired. The data may be encrypted if the data comprises proprietary information, and other security measures could be taken if desired.

While not shown, an additional step may be clearing the memory of the mobile terminal 10 of the vending machine data so that the mobile terminal 10 may reuse that memory. Alternatively, the vending machine data may be kept until a time stamp threshold has passed; e.g. when the vending machine data is more than three days old, it is removed from memory. In still another embodiment, the data is overwritten as needed, but never purposefully purged from the memory.

While the embodiment shown and described in FIGS. 2 and 3 is operative, there may be situations where it is desirable to consolidate information from several vending machines 10 placed on multiple mobile terminals 40 and report it only once, thereby saving on charges associated with, for example, a cellular phone call. In a first alternate embodiment, the mobile terminal 40 may pass a plurality of vending machines 10 and collect vending machine data from each one in turn. Then, when the periodic call is placed to the remote central computer 48, all of the vending machine data is sent at once. In a permutation of this embodiment, the vending machine data is collected from vending machines until a certain threshold is met, and then the call is placed.

For example, if each burst of vending machine data takes seven seconds to transmit to the remote central computer 48, then the mobile terminal 40 may collect data from eight vending machines 10 before sending the vending machine data to the remote central computer 48. Data from eight vending machines would equal approximately fifty-six seconds of vending machine data to be transmitted. Since cellular calls are usually billed in increments of one minute, there is no incremental cost for sending the vending machine data from the seven extra vending machines 10, whereas a ninth vending machine 10 would push the call over a minute, resulting in charges for two minutes of air time even though the call only lasted one minute, three seconds. Other thresholds are also possible. Additionally, to prevent the vending machine data from becoming stale, a timer threshold may also be associated with the vending machine data, so that regardless of how many additional vending machines 10 have provided vending machine data to the mobile terminal 40, once the data has been resident upon the mobile terminal for a predetermined amount of time, the mobile terminal 40 sends the data to the remote central computer 48. For example, once the data is twenty hours old, the mobile terminal 40 attempts to make a call to the remote central computer 48.

Figure 4:
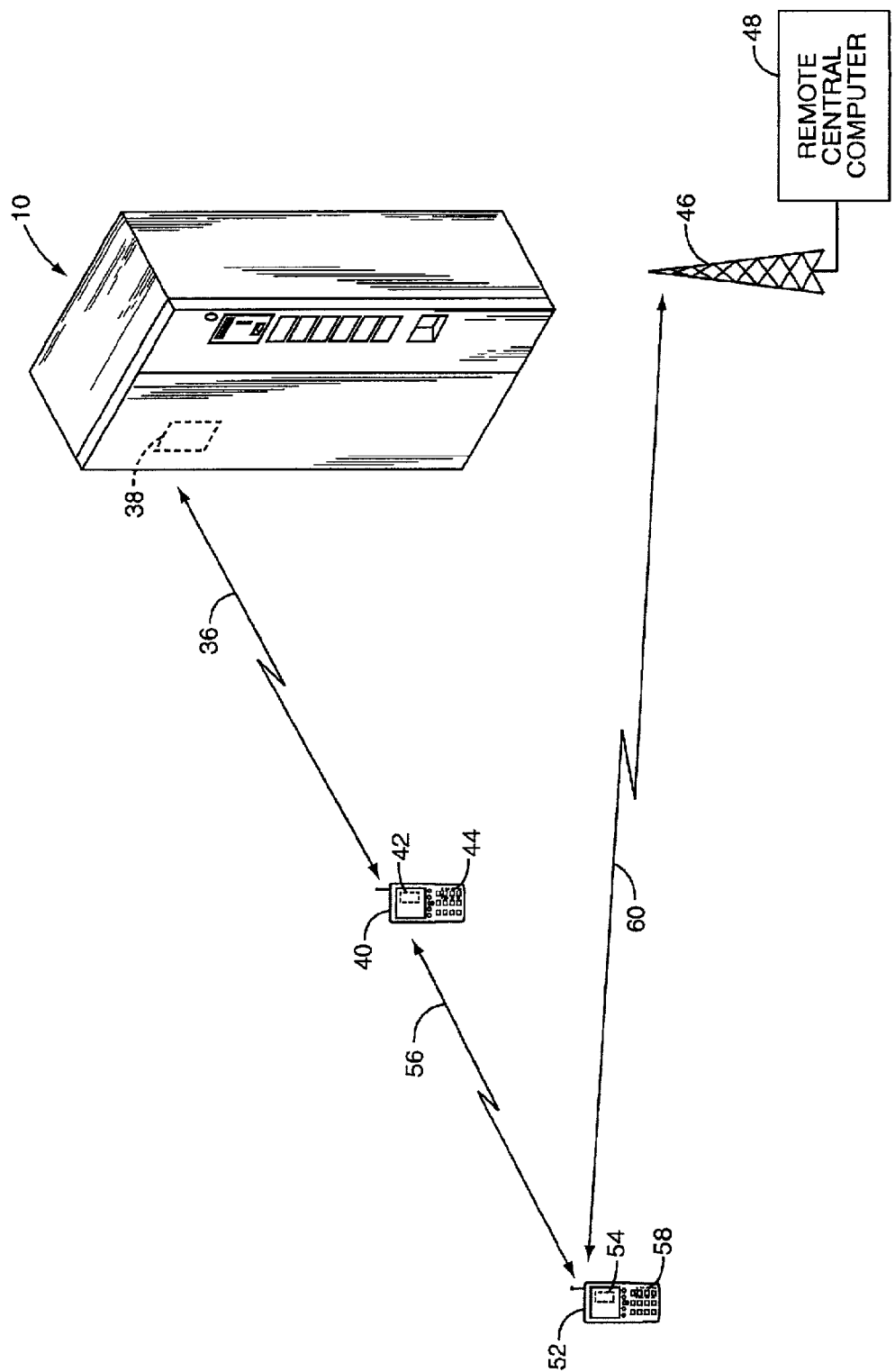
FIG. 4 is an exemplary hardware diagram of an alternate embodiment of the present invention.

In still another embodiment, illustrated in FIG. 4, the data may be sent to the remote central computer 48 indirectly. Specifically, the vending machine 10 sends the vending machine data to the mobile terminal 40, as previously described. However, before the mobile terminal 40 sends the vending machine data to the remote central computer 48, the mobile terminal 40 comes into close proximity of a second mobile terminal 52. Close proximity in this context is within short range communication distance (i.e. less than five meters). The second mobile terminal 52 may comprise a short range communication circuit 54, and a short range communication signal 56 may pass between the two mobile terminals 40, 52.

The vending machine data may then be transferred to the second mobile terminal 52. The second mobile terminal 52 may comprise a long range communication circuit 58 which establishes a long range communication link 60 to the remote central computer 48, just as previously described and illustrated in FIGS. 2 and 3 for a single mobile terminal 40 embodiment.

Figure 5:
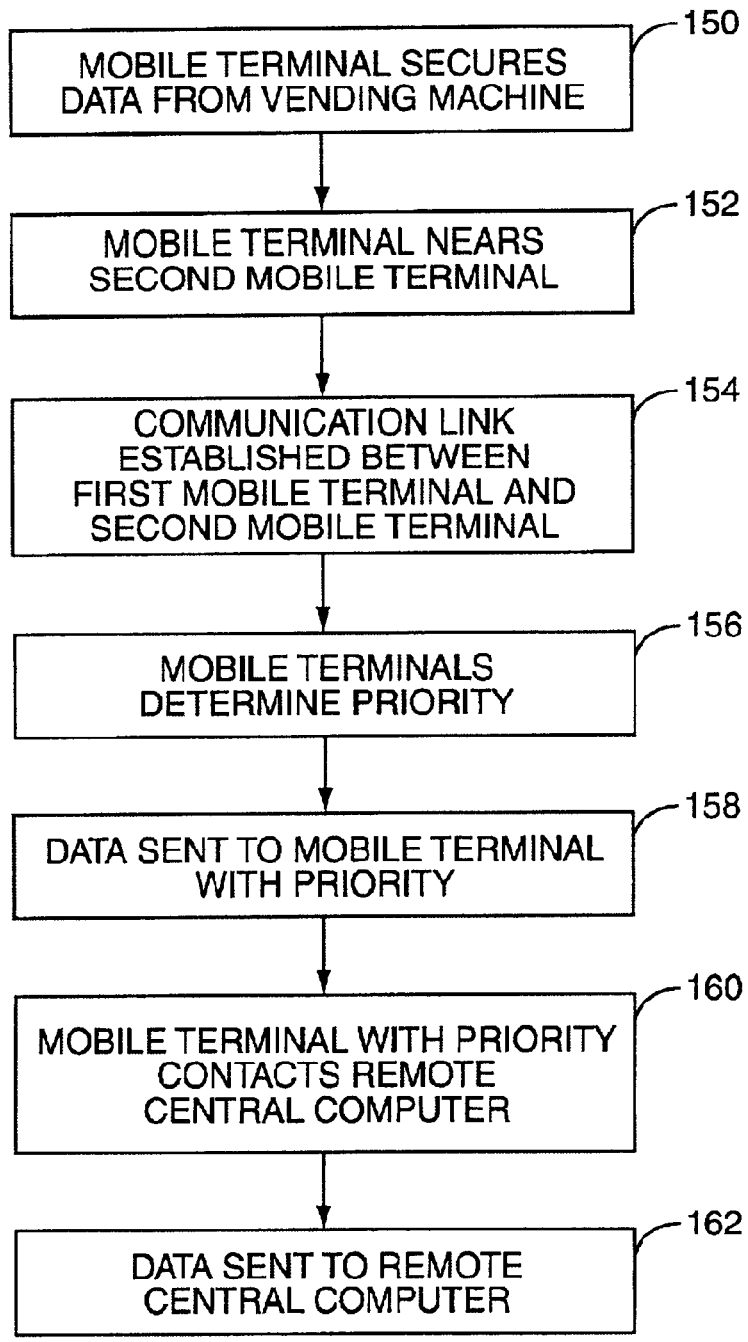
FIG. 5 is a flow chart illustrating the processes of the hardware of FIG. 4.

The process of this multiple mobile terminal 40, 52 embodiment is illustrated in FIG. 5. The process begins as earlier described, wherein the mobile terminal 40 secures the data from the vending machine 10 (block 150). Sometime subsequent to securing the vending machine data, the mobile terminal 40 comes into close proximity with the second mobile terminal 52 (block 152).

The two mobile terminals 40, 52 establish a communication link therebetween (block 154). In an exemplary embodiment this communication link may be via the short range communication circuits 42, 54 respectively. The mobile terminals 40, 52 may periodically poll the surrounding area to determine if any compatible short range communicators are nearby. This periodic polling may be done according to the Bluetooth protocol, the IEEE 802.11 protocol, or other standard as previously discussed in the single mobile terminal 40 embodiment. Upon receipt of a positive response, a communication link 56 is established. Alternatively, the user may actuate a command in the mobile terminal 40 and/or 52 and cause the mobile terminal 40, 52 to poll the surrounding area for a nearby short range communicator.

Once the communication link 56 is established, the mobile terminals 40, 52 may determine which mobile terminal 40, 52 has priority over the other (block 156). This may be done by comparing time stamps as to which mobile terminal 40, 52 has the older data and thus needs to send the data to the remote central computer 48 sooner. Alternatively, because mobile terminals 40, 52 may have data from multiple vending machines 10 stored in memory, the mobile terminal 40, 52 with the largest amount of data already present in memory is determined to have priority. In still another embodiment, the mobile terminal 40, 52 that has the higher battery charge is determined to have priority. This increases the likelihood that the mobile terminal 40, 52 will be able to contact the remote central computer 48. Other schemes for determining priority are also possible.

After the priority is determined, the data is sent to the mobile terminal 40, 52 with priority (block 158). In the embodiment shown, mobile terminal 52 has priority and thus receives the data from the mobile terminal 40 over the communication link 56.

In an alternate embodiment, the mobile terminals 40, 52 exchange data so that both mobile terminals 40, 52 have both sets of data. This redundancy may increase the likelihood that the remote central computer 48 receives the data, but may also put a strain on the networks that convey the information, such as the PLMN. Also, the remote central computer 48 would need some way to determine that the data is duplicative so that it is not accounted for twice. This may be done with a flag or other indicia that the information is duplicated information, since the vending machine data may have embedded therewithin a unique ID and/or date/time stamp of the vending machine 10 to which it pertains.

After the exchange of information, the mobile terminal 52 that has priority, and has all the data, contacts the remote central computer 48 (block 160). This may be done by placing a call over the PLMN through a long range communication link 60 or other equivalent technique as described above with reference to block 108 above.

The data is then sent to the remote central computer 48 (block 162). Again, the establishment of the communication link 60 may be done periodically or after a certain time threshold has expired or the like as needed or desired.

Figure 6:
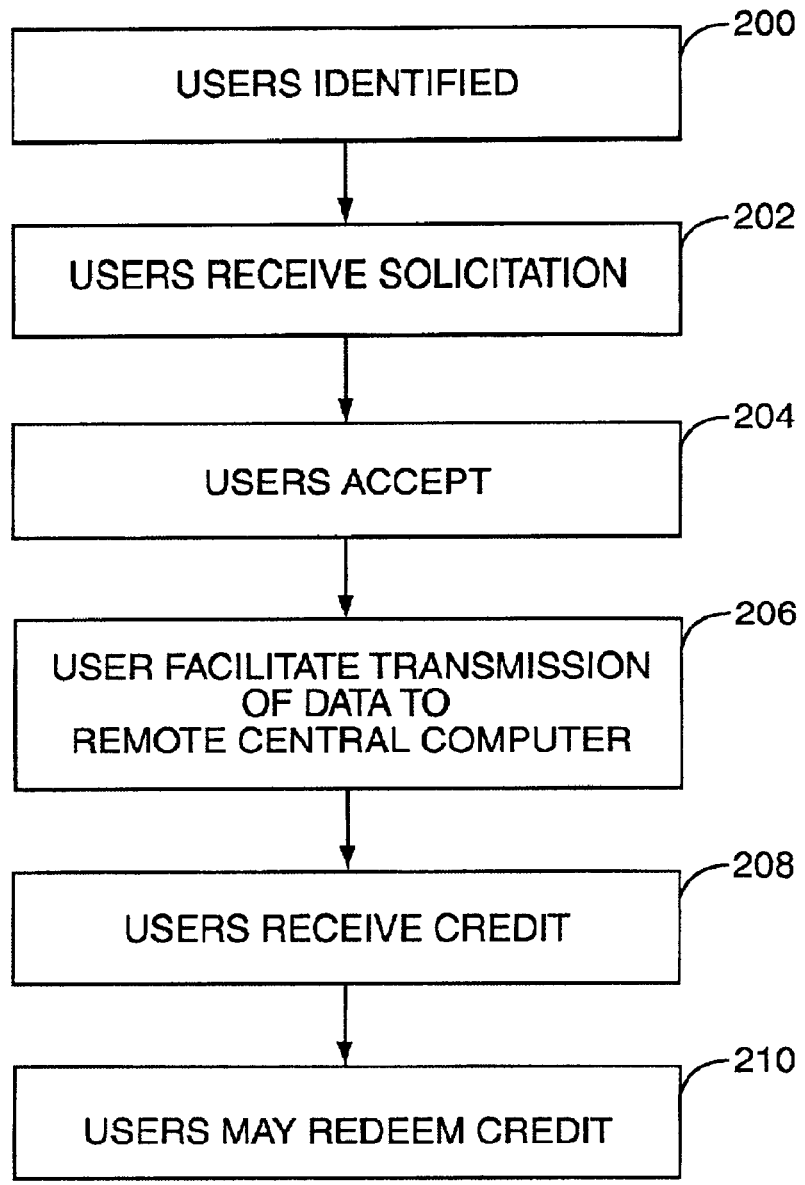
FIG. 6 illustrates a flow chart illustrating an incentivizing process that may be used in an alternate embodiment of the present invention.

Typically, users are charged for using the long range communication links 50, 60, and at a very minimum, the use of the mobile terminals 40, 52 drains the batteries thereof, reducing the ability of the users to use the mobile terminals for personal use. Thus, to convince users to allow their mobile terminals 40, 52 to be used in this manner, incentive schemes may be provided to encourage participation. If a user desires to allow the cellular phone to participate in the system of the present invention, the user's mobile terminal 40 is configured to recognize short range communications from the vending machine 10 and other mobile terminals 40, 52 as discussed herein. A process by which this is done is illustrated in a flow chart format in FIG. 6.

Initially, potential users are identified (block 200). This may be done by surveys, questionnaires, or the like. For example, when a user buys a mobile terminal 40, the vendor may include a brochure for the service or ask the user a question as part of the questionnaire asking if the user would be interested in providing this service. As still another possibility, the operator of the vending machine 10 may watch the vending machine 10 for a period of time and approach individuals that patronize the vending machine 10. Other identification schemes are possible as well.

Once identified, the users receive a solicitation (block 202). This may be done through the mail, in person, over the phone, or the like. The solicitation may or may not contain all of the details of the incentive plan as needed or desired. Follow-ups or contact information may be provided so that the user may get more information with which to make an informed decision.

The users accept the solicitation (block 204) and agree to participate in the incentivized plan to facilitate vending machine data collection and transmission to the remote central computer 48. The users may download software to their mobile terminals 40 so as to provide the present functionality and be assigned a unique identifier in the process. Alternatively, their unique identifier may be their mobile identification number, a phone number associated with the mobile terminal 40, or the like as needed or desired. The software transfer may be done wirelessly, through a diskette, or the like as needed or desired.

The users that have agreed to participate then facilitate the transmission of the vending machine data to the remote central computer 48 by periodically visiting the vending machines 10 (block 206). In some instances, this may be part of their daily routine as they purchase a soda in the parking structure on the way into work or the like. In other instances, the users may have to make a point to visit the vending machine 10 on a regular basis. In a preferred embodiment, multiple users would interact with the vending machine 10, thus increasing the likelihood that the vending machine data was passed to a mobile terminal 40 for later transmission to the remote central computer 48.

In exchange for this facilitation and the use of the mobile terminals 40, the users may receive a credit (block 208). In a first embodiment, this credit comprises a subsidy that is paid to the user to help pay for the cellular phone bill. This may be done by direct deposit, check, or the like. In a second embodiment, this credit may comprise a coupon that is issued to the user and that may be redeemed for the purchase of goods. In an exemplary embodiment, the coupon is for goods sold in the vending machine 10. Rebate coupons may also be provided. In a third embodiment, the users receive a credit in the form of an electronic discount on purchases made from the vending machine 10 or on the cost per minute of cellular phone usage time. In still another embodiment, a threshold is created, and once the user has passed the threshold a free item is provided from the vending machine. For example, after ten transmissions to the remote central computer 48, a soda is dispensed for the user. To this end, the unique identifier discussed above may be used. Additionally, the authorization sequences used above to make sure that the user is authorized to receive the vending machine data may be used to verify that the credit is being delivered to the proper user.

Depending on the nature of the credit, the vending machine 10 may have to do the verification. Alternatively, the remote central computer 48 may do the verification and provide the mobile terminal 40 with a code that authorizes the credit in a vending machine 10. Therefore, remote central computer 48 may reference a database to provide this credit. Alternatively, the mobile terminal 40 may reference a database associated with the remote central computer 48 as needed or desired. Other arrangements for the credit are also possible.

Upon receipt of the credit, the user may redeem the credit (block 210). Where the credit is a discount, this involves a purchase as would be well understood. Alternatively, the user may have to wait until they have transferred enough data to qualify for the credit before redemption.

Where the vending machine data is transmitted through two or more mobile terminals 40, 52, the operator may modify the credit as needed or desired to make it worthwhile for the users and the operator.

Those skilled in the art will recognize improvements and modifications to the preferred embodiments of the present invention. All such improvements and modifications are considered within the scope of the concepts disclosed herein and the claims that follow.

What is claimed is:

1. A communication system, comprising:
    a vending machine, comprising a first short range communication circuit; and
    a mobile terminal, comprising:
    a second short range communication circuit, selectively communicating with said first short range communication system to secure vending machine data from said vending machine; and
    a long range communication circuit through which said vending machine data from said vending machine is sent to a remote location;
    wherein said mobile terminal accrues credits for communicating said vending machine data from said vending machine to the remote location.

2. A communication system, comprising:
    a vending machine, comprising a first short range communication circuit;
    a mobile terminal, comprising:
        a second short range communication circuit, selectively communication with said first short range communication system to secure vending machine data from said vending machine; and
        a long range communication circuit through which said vending machine data from said vending machine is sent to a remote location; and
    a second vending machine, said mobile terminal collecting vending machine data from said second vending machine and combining the vending machine data from said second vending machine with the vending machine data from said vending machine prior to sending the vending machine data to the remote location.

3. A communication system for communicating vending machine data to a remote location through a wireless communication network, comprising:
    a vending machine comprising a first short range communication circuit;
    a first mobile terminal comprising a second short range communication circuit;
    a second mobile terminal comprising a third short range communication circuit and a long range communication circuit;
    said vending machine sending the vending machine data to said first mobile terminal from said first short range communication circuit to said second short range communication circuit;
    said first mobile terminal sending the vending machine data to said second mobile terminal from said second short range communication circuit to said third short range communication circuit; and
    said second mobile terminal sending the vending machine data to a remote location through said long range communication circuit.

4. The communication system of claim 3, wherein said short range communication circuits are selected from the group consisting of: Bluetooth modules and 802.11 compatible circuits.

5. The communication system of claim 3, wherein said second mobile terminal sends the vending machine data to a remote location by placing a phone call to the remote location.

6. The communication system of claim 3, wherein said second mobile terminal collects vending machine data from a plurality of vending machines prior to sending the vending machine data to a remote location.

7. The communication system of claim 3, wherein said second mobile terminal sends the vending machine data through the PLMN.

8. An incentivized system for reporting vending machine data to a remote location, comprising:
    a vending machine, comprising a first short range communication circuit and data;
    a mobile terminal, comprising a second short range communication circuit and a long range communication circuit;
    said mobile terminal receiving the vending machine data from said vending machine through said first and second short range communication circuits and passing the vending machine data to a remote location for further processing through said long range communication circuit; and
    said mobile terminal having a credit associated therewith in exchange for passing the vending machine data to the remote location.

9. The system of claim 8, wherein said credit is selected from the group consisting of a rebate and a discount.

10. The system of claim 8, wherein said credit comprises a coupon providing a discount on a future purchase.

11. The system of claim 10, wherein said discount on a future purchase comprises a free item dispensed from a vending machine.

12. The system of claim 8, wherein said credit comprises a subsidy for placing a cellular phone call over the long range communication circuit.

13. The system of claim 12, wherein said subsidy is a discount per minute of usage.

14. The system of claim 8, wherein said short range communication circuits are selected from the group consisting of a Bluetooth module and a module based on the IEEE 802.11 standard.

15. The system of claim 8, wherein said mobile terminal is a cellular phone.

16. The system of claim 8, wherein said credit is provided monthly.

17. The system of claim 8, wherein said credit is stored in said mobile terminal.

18. The system of claim 8, wherein said credit is stored in said vending machine.

19. A method of incentivizing relay communications between a vending machine and a remote location, said method comprising:
    uploading vending machine data from the vending machine to a mobile terminal associated with a third party;
    receiving the vending machine data from the mobile terminal at the remote location via a long range wireless communication; and providing a credit to the third party in exchange for sending the vending machine data.

20. The method of claim 19, wherein providing a credit comprises providing a refund to the third party.

21. The method of claim 19, wherein providing a credit comprises providing a coupon to the third party.

22. The method of claim 19, wherein providing a credit comprises providing a subsidy for an account associated with the long range wireless communication.

23. The method of claim 19, wherein providing a credit comprises accumulating partial credits for individual communications to the remote location until a threshold is reached and then providing a free good for the credit.

24. The method of claim 19, wherein receiving the vending machine data from the mobile terminal at the remote location via a long range wireless communication comprises receiving a phone call from the mobile terminal over the PLMN.

25. The method of claim 19, wherein arranging to upload vending machine data from the vending machine to a mobile terminal associated with a third party comprises wirelessly uploading the data to the mobile terminal.

26. The method of claim 25, wherein wirelessly uploading the vending machine data to the mobile terminal comprises uploading the vending machine data with a Bluetooth module.

27. The method of claim 19, further comprising receiving from the mobile terminal vending machine data from a plurality of vending machines.

28. A method of communicating, comprising:
   determining that a mobile terminal is proximate a vending machine;
   verify that said mobile terminal is proximate to said vending machine; and
   if said mobile terminal is proximate to said vending machine;
      uploading vending machine data from the vending machine to the mobile terminal via a short range communication circuit; and
      receiving, at a remote location, the vending machine data from the mobile terminal over a long range communication circuit.

29. The method of claim 25, wherein determining that a mobile terminal is proximate a vending machine comprises establishing a short range communication loop via one of the modules selected from the following group consisting of: a Bluetooth module and an IEEE 802.11 module.

30. The method of claim 28, wherein uploading vending machine data from the vending machine to the mobile terminal via a short range communication circuit comprises uploading the vending machine data via a communication circuit selected from the group consisting of: a Bluetooth communication circuit and an IEEE 802.11 compatible communication circuit.

31. The method of claim 28, wherein receiving, at a remote location, the vending machine data from the mobile terminal over a long range communication circuit comprises receiving the vending machine data over a phone line.

32. A method of communicating, comprising:
   passing by a vending machine with a mobile terminal;
   receiving, at the mobile terminal from the vending machine, vending machine data relating to the vending machine;
   subsequently transmitting, wirelessly, over a long range communication circuit the vending machine data to a remote location; and
   receiving vending machine data from at least one other vending machine prior to transmitting the vending machine data to the remote location.

33. The method of claim 32, wherein receiving data from at least one other vending machine comprises receiving the vending machine data from a second mobile terminal.

34. The method of claim 33, wherein receiving the vending machine data from a second mobile terminal comprises receiving the vending machine data from a second mobile terminal through a module selected from the group consisting of: a Bluetooth module and an IEEE 802.11 compatible module.

35. The method of claim 33, further comprising determining priority between the two mobile terminals as to which mobile terminal should receive the vending machine data from the other.

36. The method of claim 32, wherein subsequently transmitting the vending machine data comprises placing a phone call.

* * * * *